United States Patent
Mondello et al.

(10) Patent No.: US 12,511,397 B2
(45) Date of Patent: Dec. 30, 2025

(54) SECURE FIRMWARE UPLOAD

(71) Applicant: STMicroelectronics S.r.l., Agrate Brianza (IT)

(72) Inventors: Antonino Mondello, Messina (IT); Michele Alessandro Carrano, Catania (IT); Riccardo Condorelli, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 411 days.

(21) Appl. No.: 17/946,298

(22) Filed: Sep. 16, 2022

(65) Prior Publication Data
US 2023/0090664 A1     Mar. 23, 2023

(30) Foreign Application Priority Data
Sep. 22, 2021   (FR) ........................................ 2109983

(51) Int. Cl.
*G06F 21/57*     (2013.01)
*G06F 21/60*     (2013.01)

(52) U.S. Cl.
CPC .......... *G06F 21/572* (2013.01); *G06F 21/602* (2013.01); *G06F 2221/033* (2013.01)

(58) Field of Classification Search
CPC ................ G06F 21/572; G06F 21/602; G06F 2221/033
See application file for complete search history.

(56) References Cited

U.S. PATENT DOCUMENTS

| | | | | |
|---|---|---|---|---|
| 2011/0119460 A1* | 5/2011 | Wankhade | ............ | G06F 16/128 |
| | | | | 711/E12.001 |
| 2013/0332605 A1* | 12/2013 | Kozlowski | ............ | G06F 9/5044 |
| | | | | 709/225 |
| 2015/0121086 A1* | 4/2015 | Smith | .................... | G06F 21/556 |
| | | | | 713/189 |

(Continued)

FOREIGN PATENT DOCUMENTS

| | | | | |
|---|---|---|---|---|
| EP | 3789898 A1 | 3/2021 | | |
| WO | WO-2005076139 A1 * | 8/2005 | .......... | G06F 11/3656 |

OTHER PUBLICATIONS

Ujjwal Guin • Swarup Bhunia • Domenic Forte • Mark M. Tehranipoor; SMA: A System-Level Mutual Authentication for Protecting Electronic Hardware and Firmware; IEEE Transactions on Dependable and Secure Computing (vol. 14, Issue: 3, 2017, pp. 265-278); (Year: 2017).*

(Continued)

*Primary Examiner* — Luu T Pham
*Assistant Examiner* — Chao Wang
(74) *Attorney, Agent, or Firm* — Crowe & Dunlevy LLC (57) ABSTRACT

The present disclosure relates to a method including executing, by an electronic device, a first firmware module stored in a volatile memory of the electronic device, the execution of the first firmware module causing an updated firmware key to be stored in a non-volatile memory of the electronic device, and uploading a second firmware module to the electronic device. The method also includes decrypting the second firmware module by a cryptographic processor of the (Continued)

electronic device based on the updated firmware key, and installing the decrypted second firmware module in the volatile memory of the electronic device at least partially overwriting the first firmware module.

18 Claims, 4 Drawing Sheets

(56) References Cited

U.S. PATENT DOCUMENTS

2016/0026783 A1\* 1/2016 Buer .................. G06F 21/71
 711/103
2021/0312053 A1\* 10/2021 Kloth .................. H04L 9/0861

OTHER PUBLICATIONS

M. A. Prada-Delgado • A. Vazquez-Reyes • I. Baturone; Trustworthy firmware update for Internet-of-Thing Devices using physical unclonable functions; 2017 Global Internet of Things Summit (GIoTS) (2017, pp. 1-5); (Year: 2017).\*

Shay Gueron; Memory Encryption for General-Purpose Processors; IEEE Security & Privacy (vol. 14, Issue: 6, 2016, pp. 54-62); (Year: 2016).\*

Arm: "Arm Platform Security Architecture Trusted Boot and Firmware Update 1.1 Contents", Mar. 9, 2020 (Mar. 9, 2020), XP055891415, 49 pgs.

INPI Search Report and Written Opinion for priority application, FR 2109983, report dated Apr. 29, 2022, 11 pgs.

\* cited by examiner

SECURE FIRMWARE UPLOAD

PRIORITY CLAIM

This application claims the priority benefit of French Application for Patent No. 2109983, filed on Sep. 22, 2021, the content of which is hereby incorporated by reference in its entirety to the maximum extent allowable by law.

TECHNICAL FIELD

The present disclosure relates generally to the field of electronic devices and, in particular, to ROM-less electronic devices.

BACKGROUND

Devices having limited non-volatile data storage, such as so-called "ROM-less" devices (i.e., devices without a Read Only Memory or ROM), are advantageous for the industry because of their low technological complexity and their reduced cost. For such devices, a firmware is generally stored in an external non-volatile memory and is uploaded into a random-access memory of the device. As the random-access memory is a volatile memory, its contents disappear when the device is powered down. In some environments, devices are powered for a relatively long periods, and therefore the use of a volatile memory is feasible. In case of power supply removal, the firmware is reloaded at the next boot.

Nevertheless, a technical problem is to ensure the authenticity of the firmware and it is desirable to prevent a hacker from being able to load an inauthentic firmware and to inject data into the device. There is therefore a need to ensure the authenticity of a firmware installed in a ROM-less device without a devoted hardware implementation.

SUMMARY

One embodiment addresses all or some of the drawbacks of known ROM-less devices.

According to one aspect, there is provided a method including: executing, by an electronic device, a first firmware module stored in a volatile memory of the electronic device, the execution of the first firmware module causing an updated firmware key to be stored in a non-volatile memory of the electronic device; uploading a second firmware module to the electronic device; decrypting the second firmware module by a cryptographic processor of the electronic device based on the updated firmware key; and installing the decrypted second firmware module in the volatile memory of the electronic device at least partially overwriting the first firmware module.

According to one embodiment, the method also includes, before executing the first firmware module: uploading the first firmware module to the electronic device; and decrypting the first firmware module by the cryptographic processor of the electronic device based on an initial firmware key.

According to one embodiment, the second firmware module is uploaded via an interface of the electronic device, and the volatile memory is not directly accessible by the interface, but instead via the cryptographic processor.

According to one embodiment, the initial firmware key is stored in the non-volatile memory.

According to one embodiment, the initial firmware key is stored by a hardware configuration of the electronic device.

According to one embodiment, the method also includes, after the decrypting of the second firmware module, verifying that the second firmware module has an expected format and/or content.

According to one embodiment, the first and/or second firmware module include a cyclic redundancy check field storing a CRC value, and the method further comprises verifying the CRC value by a CRC module of the electronic circuit.

According to one embodiment, the verification is based on a comparison between at least a part of the code of the first and/or second firmware module with a reference value.

According to one embodiment, the electronic device comprises a processing unit, and the method comprises powering down the processing unit during the uploading, decrypting and/or verification of the second firmware module.

According to one embodiment, the method also includes, after the execution of the first firmware module, the deactivation of the initial firmware key.

According to one embodiment, the method also includes, after the execution of the first firmware module, encryption of the first firmware module by the cryptographic processor based on the updated firmware key.

According to one embodiment, after the installation of the second firmware module, uploading a new firmware module triggers an incrementation of a count value stored in the non-volatile memory.

According to one embodiment, the method also includes the authorization to install the new firmware module based on a comparison between a value contained in the new firmware module and the count value.

According to one embodiment, the cryptographic processor is configured to perform elliptic curve cryptography to decrypt the first and/or the second firmware module.

According to a further aspect, there is provided an electronic device which includes: a volatile memory comprising a first firmware module; a non-volatile memory configurated to store an updated firmware key upon execution of the first firmware module; an interface configurated to upload a second firmware module; and a cryptographic processor configurated to decrypt the second firmware module, based on the updated firmware key; the electronic device being further configurated to install the decrypted second firmware module in the volatile memory, partially overwriting the first firmware module.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, the operations and elements that are useful for an understanding of the embodiments described herein have been illustrated and described in detail. In particular, cryptographic operations used in the method are not described in detail.

Unless indicated otherwise, when reference is made to two elements connected together, this signifies a direct connection without any intermediate elements other than conductors, and when reference is made to two elements coupled together, this signifies that these two elements can be connected or that they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
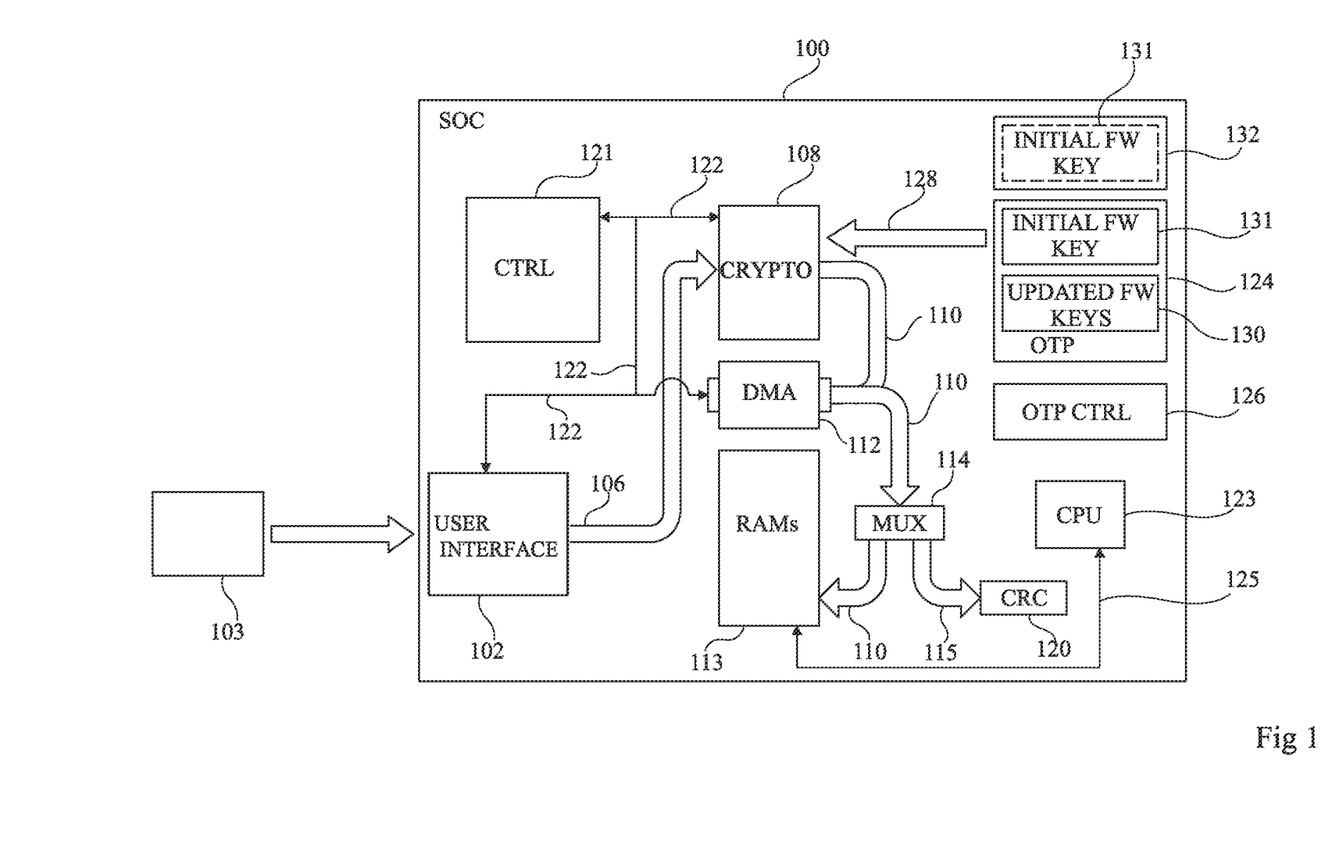
FIG. 1 schematically illustrates an example of an electronic device.

FIG. 1 schematically illustrates an example of an electronic device 100 (SoC). In some embodiments, the electronic device 100 is a system-on-chip (SoC).

The electronic device 100 comprises a user interface 102 (USER INTERFACE), which is for example a standard interface such as a Serial Peripheral Interface, coupled to an external device 103. The interface 102 is coupled, for example via a bus 106, to an input of a cryptographic processor 108 (CRYPTO). The cryptographic processor 108 for example applies a symmetric encryption and/or decryption scheme such as AES (Advanced Encryption Scheme) or 3DES (Triple Data Encryption Standard). An output of the cryptographic processor 108 is coupled, for example via a bus 110 and via a direct memory access unit 112 (DMA), to a volatile memory 113 (RAM). The volatile memory 113 is for example a Random-Access Memory (RAM) such as an SRAM (Static Random-Access Memory). In some embodiments a multiplexer 114 (MUX) is also coupled to the bus 110, one output of the multiplexer 114 being coupled, for example via the bus 110, to the volatile memory 113 and another output of the multiplexer 114 being coupled, for example via a bus 115, to a data verification unit 120 (CRC). The data verification unit 120 is for example a Cyclic Redundancy Check unit configured to verify the data based on one or more CRC bits. The interface 102, the cryptographic processor 108 and the direct memory access unit 112 are for example controlled by a control circuit 121 (CTRL) via control lines 122.

The electronic device 100 further comprises a processor 123 (CPU) and a one-time programmable memory (OTP) 124. The processor 123 is for example a central processing unit (CPU) and is for example coupled to the volatile memory 113 via a bus 125. Writing to the OTP memory 124 is for example controlled by an OTP control circuit 126 (OTP CTRL). An output 128 of the one-time programmable memory 124 is for example coupled to the cryptographic processor 108. The OTP memory 124 stores for example one or more updated firmware keys 130 (UPDATED FW KEYS).

The device 100 further comprises an initial firmware key 131 (INITIAL FW KEY) stored in the OTP memory 124 or alternatively hard coded in a logic circuit 132, for example during a coding design phase.

The interface 102 is not for example coupled to the bus 125, and there is for example no direct connection between the interface 102 and the volatile memory 113. Thus, the volatile memory 113 is for example inaccessible by the interface 102, except via the cryptographic processor 108. The cryptographic processor 108 for example accesses the volatile memory 113 via the direct memory access unit 112.

The volatile memory 113 for example stores firmware that is executed by the processor 123. The firmware is for example loaded onto the electronic device 100 from the external device 103. For example, in some cases, the external device 103 is permanently connected to the electronic device 100, such as if the external device 103 and electronic device 100 are mounted on a same PCB (Printed Circuit Board) or motherboard. In the other cases, the external device 103 may be coupled to the electronic device 100 when firmware is to be loaded onto the device 100, such as following power-up of the device 100, or when the firmware is to be updated.

Operation of the electronic devices 100 and external device 103 of FIG. 1, will now be described in more detail with reference to FIG. 2.

Figure 2:
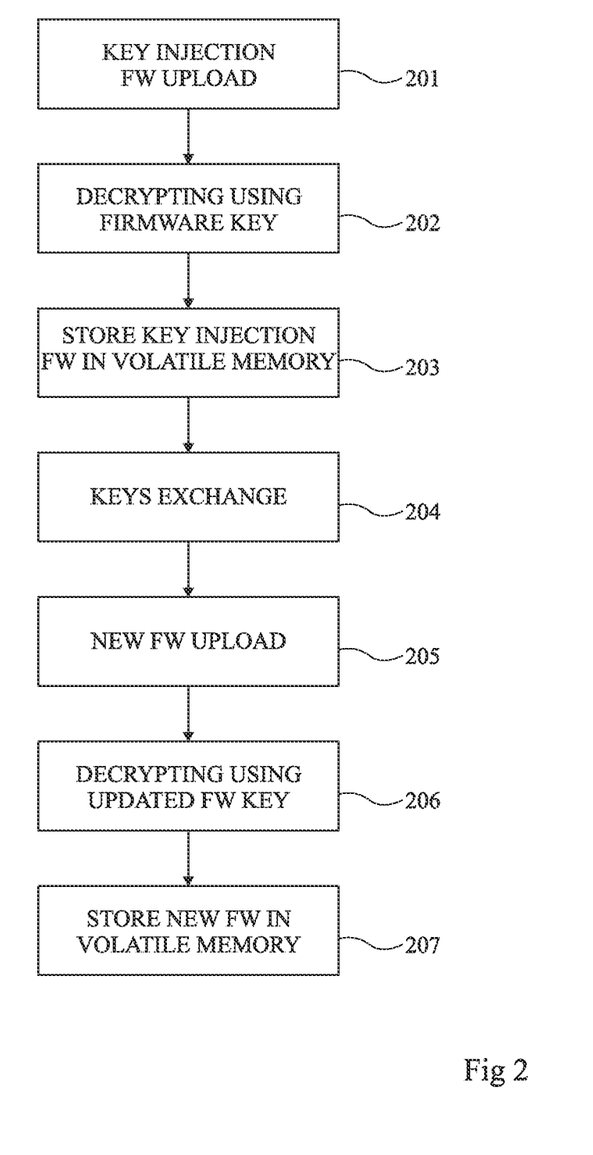
FIG. 2 is a flow diagram illustrating operations of a method for securely uploading firmware to the electronic device of FIG. 1.

FIG. 2 is a flow diagram illustrating operations of a method for securely uploading new firmware to the electronic device 100 of FIG. 1. The method of FIG. 2 is for example implemented when the electronic device 100 is powered up for the first time in order to perform a first installation of firmware on the device. Additionally, or alternatively, the method of FIG. 2 is for example performed upon power up of the device 100 following a period in which the device 100 was powered down and thus the volatile memory 113 lost its data. Additionally or alternatively, the method of FIG. 2 is for example performed when a firmware update is to be performed.

In an operation 201 (KEY INJECTION FW UPLOAD), an encrypted firmware, allowing a key exchange protocol, is uploaded to the electronic device 100. This firmware will be referred to as a key injection firmware. The key injection firmware is for example uploaded to the device 100 from the external device 103. In some cases, the communication channel between the external device 103 and the device 100 is an unsecure channel.

In an operation 202 (DECRYTING USING FW KEY), the encrypted key injection firmware is decrypted by the cryptographic processor 108. For example, the encrypted key injection firmware is received by the interface 102 of the electronic device, and transmitted via the bus 106 to cryptographic processor 108. In the case of a first firmware installation, in other words if no firmware has yet been installed in the electronic device 100, the decryption is for example performed using the initial firmware key 130. As described in relation with FIG. 1, the initial firmware key 131 is for example stored by the OTP memory 124, and is provided from the output 128 of the OTP memory 124 to the cryptographic processor 108. Alternatively, the initial firmware key 131 is stored by the logic circuit 132, and provided at an output of this logic circuit 132 to the cryptographic processor 108. As yet a further alternative, in the case that firmware has previously been installed on the device, such as in the case of a firmware update, the decryption is for example performed using one of the updated firmware keys 130, which is for example provided at the output 128 of the OTP memory 124. In some embodiments, the cryptographic processor 108 decrypts the firmware using cryptographic operations based on symmetric cryptography.

In an operation 203 (STORE KEY INJECTION FW TO VOLATILE MEMORY), the decrypted key injection firmware is stored in the volatile memory 113. In some embodiments, during the uploading and decryption of the key injection firmware, the control circuit 121 is configured to power down or to disable the processor 123. Once the key injection firmware has been stored in the volatile memory 113, the control circuit 121 is for example configured to power up the processor 123.

In an operation 204 (KEYS EXCHANGE), the decrypted key injection firmware is executed by the processor 123. This for example causes the processor 123 to control the OTP control circuit 126 to store an updated firmware key to the OTP memory 124. The execution of the decrypted key injection firmware by processor 123 allows the electronic device 100 and the external device 103 to exchange a secret key, using for example a public key cryptographic scheme, implemented by the key injection firmware. As an example, an elliptic curve scheme is used, such as Diffie-Helman or the like.

In some embodiments, operation 204 is executed several times to install more than one secure secret key in different regions of OTP memory 124.

In an operation 205 (NEW FW UPLOAD), encrypted new firmware, corresponding to an encrypted version of a new firmware that is to be installed in the device 100, is uploaded to the electronic device 100. The new firmware is for example uploaded to the device 100 from the external device 103. In some cases, the communication channel between the external device 103 and the device 100 is an unsecure channel. The new firmware is for example an updated version of a firmware already stored in the volatile memory 113. Alternatively, the new firmware corresponds for example to programs for the final user of the device and is installed on the device for the first time, for example by a party other than the manufacturer.

In an operation 206 (DECRYTING USING UPDATED FW KEY), the encrypted new firmware is decrypted by the cryptographic processor 108. For example, the encrypted new firmware is received by the interface 102 of the electronic device, and transmitted via the bus 106 to cryptographic processor 108. The decryption is for example performed using one of the updated firmware keys 130. As described in relation with FIG. 1, the updated firmware key 130 is for example stored by the OTP memory 124 and provided from the output 128 of the OTP memory 124 to the cryptographic processor 108. In some embodiments, the cryptographic processor 108 decrypts the firmware using cryptographic operations based on symmetric cryptography.

In an operation 207 (STORE NEW FW IN VOLATILE MEMORY), the decrypted new firmware is stored in the volatile memory 113. In the case where the key injection firmware is also stored in the volatile memory 113, the storage of the new firmware at least partially overwrites the key injection firmware. In some embodiments, during the uploading and decryption of the new firmware, the control circuit 121 is configured to power down or to disable the processor 123. Once the new firmware has been stored in the volatile memory 113, the control circuit 121 is for example configured to power up the processor 123.

According to an embodiment, once the key injection firmware is stored in the volatile memory 113, the initial firmware key 132 is deactivated. For example, in the case where the initial firmware key 131 is stored by the OTP memory 124, the bits of the key are programed in order to overwrite the key. Alternatively, the key injection firmware is re-encrypted, for example using one of the updated firmware keys 130. This allows the key injection firmware to be re-used, for example before updating the new firmware or following a loss of the data contained in the volatile memory 113.

Figure 3:
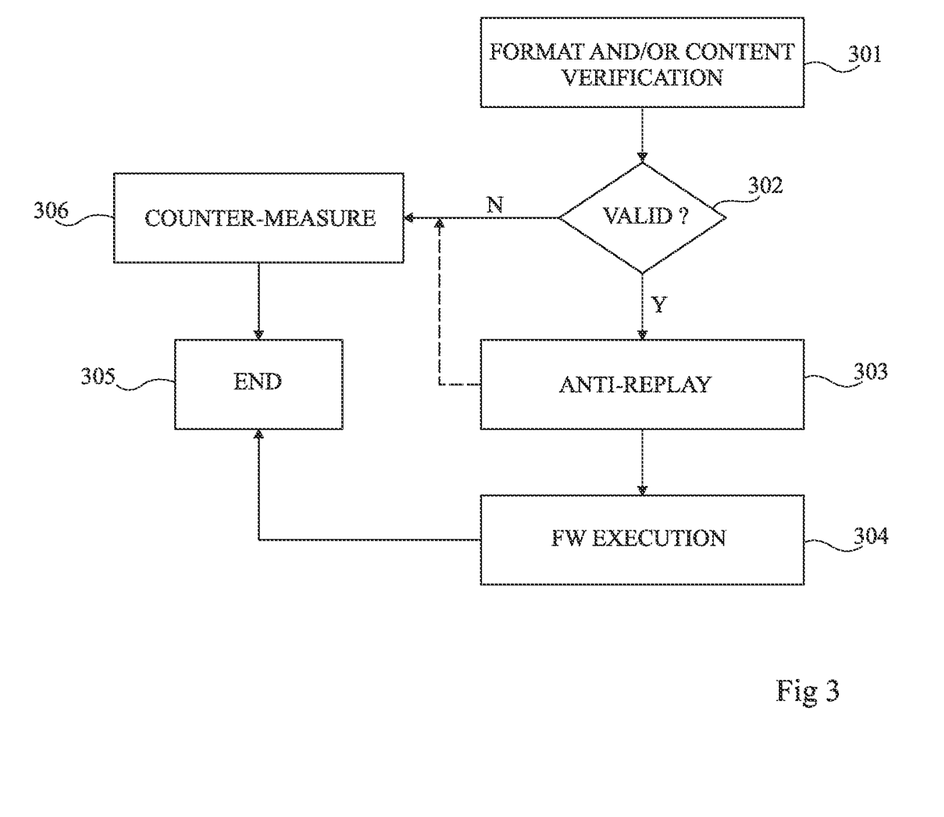
FIG. 3 is a flow diagram illustrating a firmware verification operation.

FIG. 3 is a flow diagram illustrating a firmware verification operation according to an embodiment of the present disclosure. In particular, FIG. 3 illustrates an example of a verification operation that can be optionally performed by the electronic device 100 between operations 202 and 203 and/or between operations 206 and 207 of the method of FIG. 2. For example, the firmware is verified following decryption and prior to its execution by the processor 123.

According to some embodiments, at the start of the firmware verification operation, the processor 123 is still in a powered down state and is powered up if the firmware is successfully verified. The powered down state of processor 123 reduces the power consumption and reduces the risk of a hacker being able to enter codes and/or data in the electronic device 100.

In an operation 301 (FORMAT AND/OR CONTENT VERIFICATION), which for example follows the operation 202 and/or 206, a verification of the correct decryption and authenticity of the decrypted firmware is performed. According to some embodiments, a further verification operation is performed, on-the-fly, while the upload and/or decryption process is ongoing. This allows possible data corruption to be detected, for example corruption due to noise. In the case that corrupted data is detected, the user interface 102 is for example used to abort operation 202 and/or operation 206. For example, the verification of the correct decryption and authenticity of the decrypted firmware involves checking that the firmware has an expected format and/or content. The verification may be based on some dedicated field inside the decrypted firmware. Indeed, it is unlikely that a fraudster would be able to generate a malware that, once processed by the cryptographic processor 108, results in an expected value of such bits. In some embodiments, the verification is based on a comparison between a header of the decrypted firmware and a reference string of bits stored by the electronic device, for example in the OPT memory 124 or by the logic circuit 132. Additionally or alternatively, the verification is based on the calculation of a signature, such as a MAC (message authentication code), of the decrypted firmware, and the comparison of the calculated signature with a signature provided with the encrypted firmware.

The format and/or content verification is for example performed by firmware verification hardware (not illustrated in the figures), which is capable of accessing locations in the volatile memory 113 in order to check for expected values. For example, the firmware verification hardware checks a MAC (Message Authentication Code) value of the firmware and/or any other header/trailer of the firmware. This operation for example permits the authenticity as well as the integrity of the firmware to be verified.

In an operation 302 (VALID?), the result of the comparison is for example transmitted to the control circuit 121. If the decryption and the authenticity of the firmware are validated (branch Y) the process continues with an operation 303 (ANTI-REPLAY).

In operation 303, which is optional, an anti-replay mechanism is for example implemented in order to prevent an obsolete version of encrypted firmware from being re-installed on the electronic device 100. For example, the anti-replay mechanism involves incrementing a pseudo-monotonic counter, which for example stores a count value in non-volatile memory, such as in the OTP memory 124.

The count value is then for example compared to a count value contained in the firmware. If the count values match, or in the absence of an anti-replay mechanism, the process continues with an operation 304 (FW EXECUTION).

In the operation 304, the firmware is executed. According to an embodiment, the processor 123 is powered up to execute the firmware. The process then ends in an operation 305 (END), and the device is ready to be used for its final purpose.

If in operation 302 it is determined that the firmware was not validated in the operation 301 (branch N of operation 302), or in case the count values do not match during the anti-replay operation 303, a counter-measure is for example implemented in an operation 306 (COUNTER-MEASURE). The counter-measure for example comprises deleting the firmware from the volatile memory 113. Additionally or alternatively, the counter-measure involves locking the processor 123 in a powered-down state. This prevents a non-authentic firmware from being executed by the processor 123 and causing a potential security issue. The process then ends in the operation 305.

Figure 4:
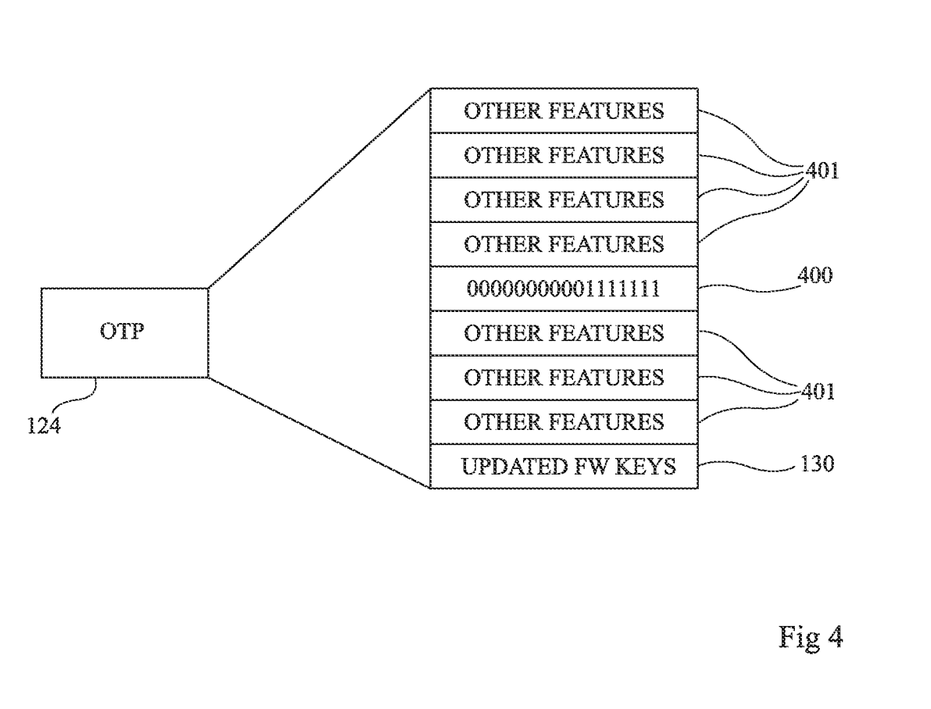
FIG. 4 illustrates an example of implementation of a pseudo monotonic counter.

FIG. 4 illustrates an example implementation of the storage of count value 400 of a pseudo-monotonic counter that can be used as part of the anti-replay mechanism in operation 303 of FIG. 3.

In the example of FIG. 4, the pseudo-monotonic counter (not illustrated in FIG. 4) is configured to store the count value 400 at a location in the OTP memory 124. Such an approach avoids the cost and complexity of a hardware implementation of a true monotonic counter. The OPT memory 124 for example stores the count value 400 in addition to one or more updated firmware keys 130 (UPDATED FW KEYS) as described in relation to FIGS. 1 and 2, and other features 401 (OTHER FEATURES) such as, for example, the initial firmware key 131 or the deactivated initial firmware key 131.

Initially, the value 400 is for example fully formed by non-programmed bits, for example 0-valued bits. Each incrementation of the count value involves a write operation to one of the 0-valued bits with a "1" value. For example, the bit to be written is the least significant 0-valued bit of the value 400. Thus, once the counter has been incremented n times, the n least significant bits of the count value will be set to the 1-value. Assuming the count value 400 has a length of N bits, the maximum count value that can be stored is N. In the example of FIG. 4, the pseudo-monotonic counter has already been incremented seven times. That is to say, seven new versions of firmware have been stored in volatile memory 113.

Various embodiments and variants have been described. Those skilled in the art will understand that certain features of these embodiments can be combined and other variants will readily occur to those skilled in the art. In particular, the initial firmware key can remain active after decryption and execution of the key injection firmware. The pseudo-monotonic counter can also be implemented in a different manner to the one described in relation with FIG. 4, for example using a different type of memory, and it would also be possible to use a true monotonic counter implemented in hardware.

Finally, the practical implementation of the embodiments and variants described herein is within the capabilities of those skilled in the art based on the functional description provided hereinabove.

The invention claimed is:

1. A method, comprising:
    executing, by an electronic device, a first firmware module stored in a volatile memory of the electronic device, the volatile memory being accessible only via a cryptographic processor and not directly accessible via an interface of the electronic device, the first firmware module being a key injection firmware;
    wherein executing the first firmware module causes an updated firmware key to be stored in a non-volatile memory of the electronic device, the non-volatile memory comprising a one-time programmable (OTP) memory;
    uploading a second firmware module to the electronic device via the interface, the second firmware module being a new firmware;
    decrypting the second firmware module by the cryptographic processor based on the updated firmware key, and verifying that the second firmware module has an expected format and/or content; and
    installing the decrypted second firmware module in the volatile memory, at least partially overwriting the first firmware module;
    performing, by the electronic device, a verification process to confirm the authenticity of the decrypted second firmware module prior to execution, and preventing replay of obsolete firmware updates using an anti-replay mechanism implemented by a pseudo-monotonic counter stored in the OTP memory by incrementing the pseudo-monotonic counter, wherein each incrementation of the pseudo-monotonic counter comprises writing a first logic value to a bit in the OTP memory having a second logic value.

2. The method according to claim 1, further comprising, before executing the first firmware module:
    uploading the first firmware module to the electronic device; and
    decrypting the first firmware module by the cryptographic processor of the electronic device based on an initial firmware key.

3. The method according to claim 2, wherein the initial firmware key is stored in the non-volatile memory.

4. The method according to claim 2, wherein the initial firmware key is stored by a hardware configuration of the electronic device.

5. The method according to claim 1, wherein the first and/or second firmware module includes a cyclic redundancy check (CRC) field storing a CRC value, the method further comprising verifying the CRC value by a CRC module of the electronic device.

6. The method according to claim 1, wherein verifying comprises at least a part of code of the first and/or second firmware module with a reference value.

7. The method according to claim 1, wherein the electronic device comprises a processing unit, the method comprising powering down the processing unit during the uploading, decrypting and/or verification of the second firmware module.

8. The method according to claim 2, further comprising, after the execution of the first firmware module, deactivating the initial firmware key.

9. The method according to claim 1, further comprising, after the execution of the first firmware module and before installing the second firmware module, encrypting said first firmware module by the cryptographic processor based on the updated firmware key.

10. The method according to claim 1, wherein uploading the new firmware module triggers an incrementation of a count value stored in the non-volatile memory.

11. The method according to claim 10, further comprising performing authorization to install the new firmware module based on a comparison between a value contained in the new firmware module and the count value.

12. The method according to claim 1, further comprising performing elliptic curve cryptography to decrypt the first and/or the second firmware module, using the cryptographic processor.

13. An electronic device, comprising:
a volatile memory storing a first firmware module, the first firmware module being a key injection firmware;
a non-volatile memory configured to store an updated firmware key upon execution of the first firmware module, the non-volatile memory comprising a one-time programmable (OTP) memory;
an interface configured to upload a second firmware module, the second firmware module being a new firmware;
a cryptographic processor configured to decrypt the second firmware module, based on the updated firmware key, and verify that the second firmware module has an expected format and/or content;
wherein the volatile memory is accessible via the cryptographic processor and is not directly accessible via the interface; and
a processing unit configured to install the decrypted second firmware module in the volatile memory, partially overwriting the first firmware module;
wherein the processing unit performs a verification process to confirm authenticity of the decrypted second firmware module prior to execution, and further prevents replay of obsolete firmware updates using an anti-replay mechanism implemented by incrementing a pseudo-monotonic counter stored in the OTP memory, wherein each incrementation of the pseudo-monotonic counter comprises writing a first logic value to a bit in the OTP memory having a second logic value.

14. The electronic device according to claim 13, wherein the cryptographic processor is configured to perform elliptic curve cryptography to decrypt the first and/or the second firmware module.

15. A computer readable medium comprising a non-volatile memory of an electronic device, the computer readable medium containing instructions that, when executed, cause:

Before execution of a first firmware module, the first firmware module being a key injection firmware:
uploading of the first firmware module to a volatile memory of the electronic device; and
decryption of the first firmware module by a cryptographic processor of the electronic device based on an initial firmware key;
execution, by the electronic device, of the first firmware module stored in the volatile memory of the electronic device;
wherein execution of the first firmware module causes an updated firmware key to be stored in the non-volatile memory of the electronic device;
uploading of a second firmware module to the electronic device via an interface of the electronic device, the second firmware module being a new firmware;
decryption of the second firmware module by the cryptographic processor of the electronic device based on the updated firmware key, and verification that the second firmware module has an expected format and/or content; and
installation of the decrypted second firmware module in the volatile memory of the electronic device at least partially overwriting the first firmware module, the volatile memory being accessible via the cryptographic processor and not directly accessible via the interface;
performance of a verification process to confirm the authenticity of the decrypted second firmware module prior to execution, and preventing replay of obsolete firmware updates using an anti-replay mechanism implemented by a pseudo-monotonic counter stored in the OTP memory by incrementing the pseudo-monotonic counter, wherein each incrementation of the pseudo-monotonic counter comprises writing a first logic value to a bit in the OTP memory having a second logic value.

16. The method according to claim 15, wherein the initial firmware key is stored in the non-volatile memory.

17. The method according to claim 15, wherein the initial firmware key is stored by a hardware configuration of the electronic device.

18. The method according to claim 15, further comprising, after the execution of the first firmware module, deactivating the initial firmware key.

* * * * *